(12) United States Patent
Neelay et al.

(10) Patent No.: US 6,173,214 B1
(45) Date of Patent: Jan. 9, 2001

(54) BATCH MAXIMIZATION FOR A BATCH DELIVERY SYSTEM

(75) Inventors: Dinesh Neelay, Lafayette; Glen Campbell, Frederick, both of CO (US)

(73) Assignee: Micro Motion, Inc., Boulder, CO (US)

( * ) Notice: Under 35 U.S.C. 154(b), the term of this patent shall be extended for 0 days.

(21) Appl. No.: 09/272,138

(22) Filed: Mar. 19, 1999

(51) Int. Cl.[7] ................................................. G06F 17/00
(52) U.S. Cl. ........................................ 700/240; 137/487.5
(58) Field of Search .................................. 700/240, 239; 222/55, 64; 137/487.5

(56) References Cited

U.S. PATENT DOCUMENTS

| | | |
|---|---|---|
| 4,953,751 | 9/1990 | Shannon . |
| 5,152,309 | * 10/1992 | Twerdochlib et al. ............ 137/487.5 |
| 5,249,129 | 9/1993 | Lamoureux et al. . |
| 5,316,181 | 5/1994 | Burch . |
| 5,431,302 | 7/1995 | Tulley et al. . |
| 5,687,092 | * 11/1997 | Bretmersky et al. .................. 222/55 |
| 5,975,747 | * 11/1999 | Flaherty ............................... 700/240 |
| 6,097,993 | * 8/2000 | Skupin ................................. 700/240 |

FOREIGN PATENT DOCUMENTS

| | | |
|---|---|---|
| 3236630 A1 | 4/1984 | (DE) . |
| 0 414 364 A1 | 2/1991 | (EP) . |

* cited by examiner

*Primary Examiner*—Christopher P. Ellis
*Assistant Examiner*—Khoi H. Tran
(74) *Attorney, Agent, or Firm*—Duft, Graziano & Forest, P. C.

(57) ABSTRACT

A batch delivery system that maximizes the amount of material to be transferred from a material source to a material destination by determining whether a primary total and/or a secondary total from a flowmeter have reached a primary target and a secondary target. In one embodiment of the invention, the primary target and the secondary target are mass, volume, and/or net solid.

29 Claims, 7 Drawing Sheets

BATCH MAXIMIZATION FOR A BATCH DELIVERY SYSTEM

FIELD OF THE INVENTION

This invention relates to a batch delivery system, and in particular, to a batch delivery system that maximizes delivery of a material from a material source to a material destination.

PROBLEM

Batch delivery systems are known in which material is delivered from a material source to a material destination by means of automated equipment that controls and measures the amount of material delivered. The problem in a batch delivery process is to maximize the amount of material delivered and to minimize costs of loading and transporting the material. The maximum amount of material delivered is limited by various delivery parameters which include but are not limited to the quantity that the customer has ordered, the physical constraints of the container such as mass or volume, the physical characteristics of the material, and/or any governmental restrictions regulating the transportation of the materials.

It is known that delivery of a material is controlled by monitoring the delivery of material until the material delivered meets or exceeds a certain criterion. A criterion is a constraint in the delivery parameters which must be met in the batch delivery process. The following is an example of a batch delivery system monitoring only one criterion, volume, during the delivery of a material. A cement company wishes to deliver 100 cubic yards of cement to a construction project using the least number of trips with its trucks. Each truck holds a maximum of 5 cubic yards of cement. The obvious solution calls for 20 truckloads of 5 cubic yards each. Unfortunately, the state highway authorities recently fined the cement company for exceeding the 5,000 lb. weight limit per truck. Additionally, the cement company's research shows that the day-to-day variability of the density of the sand and aggregate used in the cement contributed to a day-to-day variability in the density of the cement loaded into the trucks. This variability in density causes some trucks to weigh too much when loaded with the maximum 5 cubic yards of cement. Based on this research, the cement company assumes a worst case scenario for variations in the density of the cement. The cement company decides that a truck would be loaded with no more than 4 cubic yards of cement rather than buying an expensive scale to weigh each individual truck. Thus, it takes 25 truckloads to deliver cement to the construction site to avoid any further fines from the state highway authorities.

It is a problem that these worst case scenarios result in non-optimal transfer of material from a material source to a material destination. In the above problem, a worst case scenario for maximum weight is assumed for a certain volume. Due to normal conditions being better than worst case scenarios, the weight of the cement delivered under normal conditions is less than the weight of the cement delivered in the worst case scenario. The weight of cement delivered under normal conditions is not optimized to the maximum weight allowed. Thus, more cement could be delivered in each cement truck.

Another example of a batch delivery system monitoring only one criterion is a system measuring net solid of a material during the delivery. Net solid is the amount of a certain material (either in suspension or in solution) within a mixture of that solid and at least one other liquid material. In this example, the net solid is the amount of sugar in a mixture of sugar and water. A beverage company orders 25,000 Kg of sugar in a mixture of 40% sugar and 60% water. The container used to deliver the sugar and water mixture to the customer has a maximum volume of 10,000 liters. Analysis showed that the density of the sugar and water mixture would vary from batch to batch. To prevent spillage, the company decides to assume a worst case scenario for density variability of the mixture. After researching the density variability of the mixture, the company decides that the density of the sugar and water mixture in a worst case scenario is 2 Kg/liter. The maximum mass of the mixture to deliver is 20,000 Kg calculated from the maximum volume of the container (10,000 liters) and the density of the sugar and water mixture in the worst case scenario (2 Kg/liter). The net solid amount of sugar to deliver is 8,000 Kg per load calculated from 40% of the 20,000 Kg maximum mass of the sugar and water mixture to deliver. However, the average density of the sugar and water mixture under normal conditions is 2.5 Kg/liter. In an average delivery under normal conditions, the batch delivery system monitors the net solid delivered and delivers 8,000 Kg of the sugar to the container. Thus, in the first delivery, the container only contains 8,000 Kg of the 25,000 Kg of the sugar the customer ordered, and the mixture only occupies 8,000 liters of the container. Assuming normal conditions, the remaining 17,000 Kg will have to be delivered in 3 more deliveries. Once again, the material could not be filled to the 10,000 liter container maximum to account for the worst case scenario of density variability.

It can therefore be seen that it is a problem to monitor only one criterion in the transfer of material from a material source to a material destination which does not result in maximization of the batch delivery.

SOLUTION

The above and other problems are solved in accordance with the batch delivery system of the present invention which maximizes the amount of material to be delivered from a material source to a material destination by monitoring two targets. A primary target is the quantity of the most important constraint in the delivery parameters for the delivery of the material to the destination. Typically, the primary target is the lesser quantity of the amount of material a customer has ordered and a primary constraint of the container or transportation. An example of the primary target is a volume of a container such as 5 cubic yards. The secondary target is the quantity of the second most important constraint in the delivery of the material to the destination. An example of the secondary target is the maximum weight allowed per delivery truck such as 5,000 lbs.

One advantage of the present invention is the amount of material delivered to the destination is maximized while not meeting or exceeding the primary target or the secondary target. In one embodiment of the invention, the primary target and the secondary target are mass, volume, and/or net solid. In one embodiment where the primary target is mass and the secondary target is volume, the invention maximizes the amount of material delivered while accounting for regulatory mass restrictions for transportation, mass limits of the destination, and volume limits of the destination. The invention eliminates any need to assume any worst case scenarios for varying density. The invention accounts for the varying density of the material by not meeting or exceeding the primary target or the secondary target.

In accordance with the present invention, automated control equipment, including a flowmeter and a remotely controlled valve, are placed in series with a path over which the material is delivered to the destination. A batch controller executes instructions for controlling the delivery of the material to the destination in accordance with the present invention. The batch controller receives flow rate information from the flowmeter for the material flowing through the flowmeter. While the flow rate information is being received, the batch controller calculates a primary measurement and a secondary measurement based upon the flow rate information. The primary measurement is the quantity of material delivered through the flowmeter for a specific period of time calculated from the flow rate information in terms of the most important constraint in the delivery parameters. The secondary measurement is the quantity of material delivered through the flowmeter for a specific period of time calculated from the flow rate information in terms of the second most important constraint in the delivery parameters. The batch controller then adds the primary measurement to a primary total and adds the secondary measurement to a secondary total. The primary total is the total amount of material delivered to the material destination calculated by the summation of the primary measurement. The secondary total is the total amount of material delivered to the material destination calculated by the summation of the secondary measurement.

After the measurements have been added to the totals, the batch controller determines if the primary total is greater than or equal to the primary target specified for the batch. If the primary total is greater than or equal to the primary target, the batch controller terminates the flow of material to the destination by sending a signal to close the valve. If the primary total is less than the primary target, the batch controller determines if the secondary total is greater than or equal to the secondary target. If the secondary total is greater than or equal to the secondary target, the batch controller terminates the flow of the material to the destination by sending the signal to close the valve. If the secondary total is less than the secondary target, the batch controller returns to receiving the flow rate information from the flowmeter. The batch controller continues to monitor the primary total and the secondary total until at least one of the totals is at least equal to its target.

In the above cement example, the primary target is the volume of the truck (5 cubit yards) and the secondary target is the maximum weight for the truck (5,000 lbs.) in the invention. In the worst case scenario, the cement company assumes a maximum density a 1250 lbs./cubic yards based on the 5,000 lbs. weight limit and the assumed 4 cubic yard volume. The average density under normal conditions would be less than the maximum density in the worst case scenario because normal conditions are better than worst case scenarios. Assuming that delivery occurs under normal conditions, the overall average density of the cement is assumed to be 1100 lbs./cubic yards. The invention terminates the batch delivery when the material delivered meets or exceeds the primary target or the secondary target. In this example, the invention terminates the batch delivery when the secondary target is met at 5,000 lbs. Based on this overall average density under normal conditions and the 5,000 lbs. weight limit, each truck holds an average of 4.54 cubic yards. Delivering 100 cubic yards only takes 22 trucks instead of the 25 trucks. Thus, with the invention, the costs of delivering cement using 3 trucks are saved. In the sugar and water, the invention delivers 10,000 Kg of sugar per truck under normal conditions based on the 10,000 liter maximum and the average density of the mixture of 2.5 Kg/liter. Thus, the invention reduces the delivery of the mixture by 1 truck by delivering 10,000 Kg per truck.

It can be seen from the above that an aspect of the invention is a method of operating a material delivery system for delivering material from a material source to a material destination, said system comprising the steps of:

(a) starting a delivery of said material;

(b) receiving flow rate information from a flowmeter for said material flowing through said flowmeter;

(c) calculating a primary measurement of material flowing through said flowmeter based upon said flow rate information;

(d) calculating a secondary measurement of material flowing through said flowmeter based upon said flow rate information;

(e) adding said primary measurement to a primary total of material delivered in the delivery of said material;

(f) adding said secondary measurement to a secondary total of material delivered in the delivery of said material;

(g) determining whether said primary total is greater than or equal to a primary target;

(h) terminating delivery of said material responsive to a determination that said primary total is greater than or equal to said primary target;

(i) determining whether said secondary total is greater than or equal to a secondary target responsive to a determination that said primary total is less than said primary target;

(j) terminating delivery of said material responsive to a determination that said secondary total is greater than or equal to said secondary target; and (k) repeating steps (b)–(j) responsive to the determination that said secondary total is less than said secondary target.

Another aspect further comprises the steps of:

receiving said primary target for delivering said material from said material source to said material destination prior to said step (a); and receiving said secondary target for delivering said material from said material source to said material destination prior to said step (a).

Another aspect is that said step of calculating said primary measurement of material flowing through said flowmeter further comprises the step of calculating said primary measurement from a mass flow measurement based on said flow rate information.

Another aspect is that step of calculating said primary measurement of material flowing through said flowmeter further comprises the step of calculating said primary measurement from a volume flow measurement from said flow rate information.

Another aspect is that said step of calculating said primary measurement based upon said flow rate information further comprises the steps of:

processing said flow rate information to generate a net solid measurement; and designating said net solid measurement as said primary measurement.

Another aspect is that said step of calculating said secondary measurement of material flowing through said flowmeter further comprises the step of calculating said secondary measurement from a volume flow measurement from said flow rate information.

Another aspect is that said step of calculating said secondary measurement basic upon said flow rate information further comprises the steps of:

processing said flow rate information to generate a net solid measurement; and designating said net solid measurement as said secondary measurement.

Another aspect is that said step of starting said delivery of said material includes a step of opening a valve.

Another aspect is that said step of starting said delivery of said material includes a step of activating a pump.

Another aspect is that said steps of terminating said delivery of said material includes a step of closing a valve.

Another aspect is that said step of terminating said delivery of said material includes a step of controlling a pump.

DESCRIPTION OF THE DRAWINGS

The above and other advantages of the invention may be better understood from a reading of the following detailed description thereof taken in conjunction with the drawings in which.

DETAILED DESCRIPTION

Figure 1:
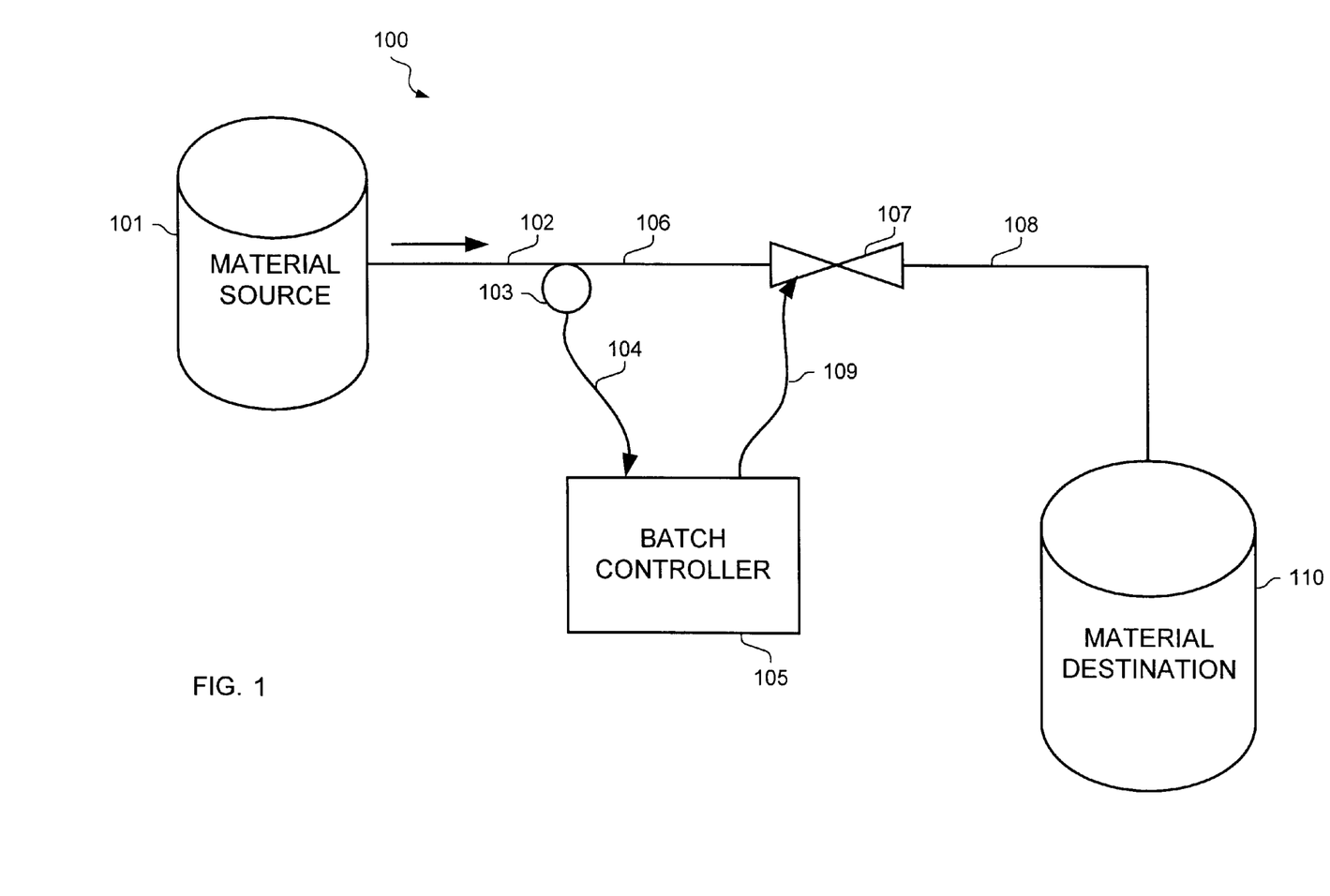
FIG. 1 is a block diagram of a batch delivery system.

FIG. 1 illustrates batch delivery system 100 of the present invention. Material is received from material source 101 and applied to flowmeter 103 over path 102. Valve 10' receives the material from flowmeter 103 via path 106. Valve 107 may alternatively be pump. The material flows from valve 107 to material destination 110 via path 108. Batch controller 105 monitors and controls the flow of material through batch delivery system 100. Flowmeter 103 sends flow information to batch controller 105 via path 104. When batch controller 105 determines that the specified amount of material has passed through flowmeter 103, batch controller 105 sends a signal over path 109 to close valve 107. Once received, valve 107 closes.

Figure 2:
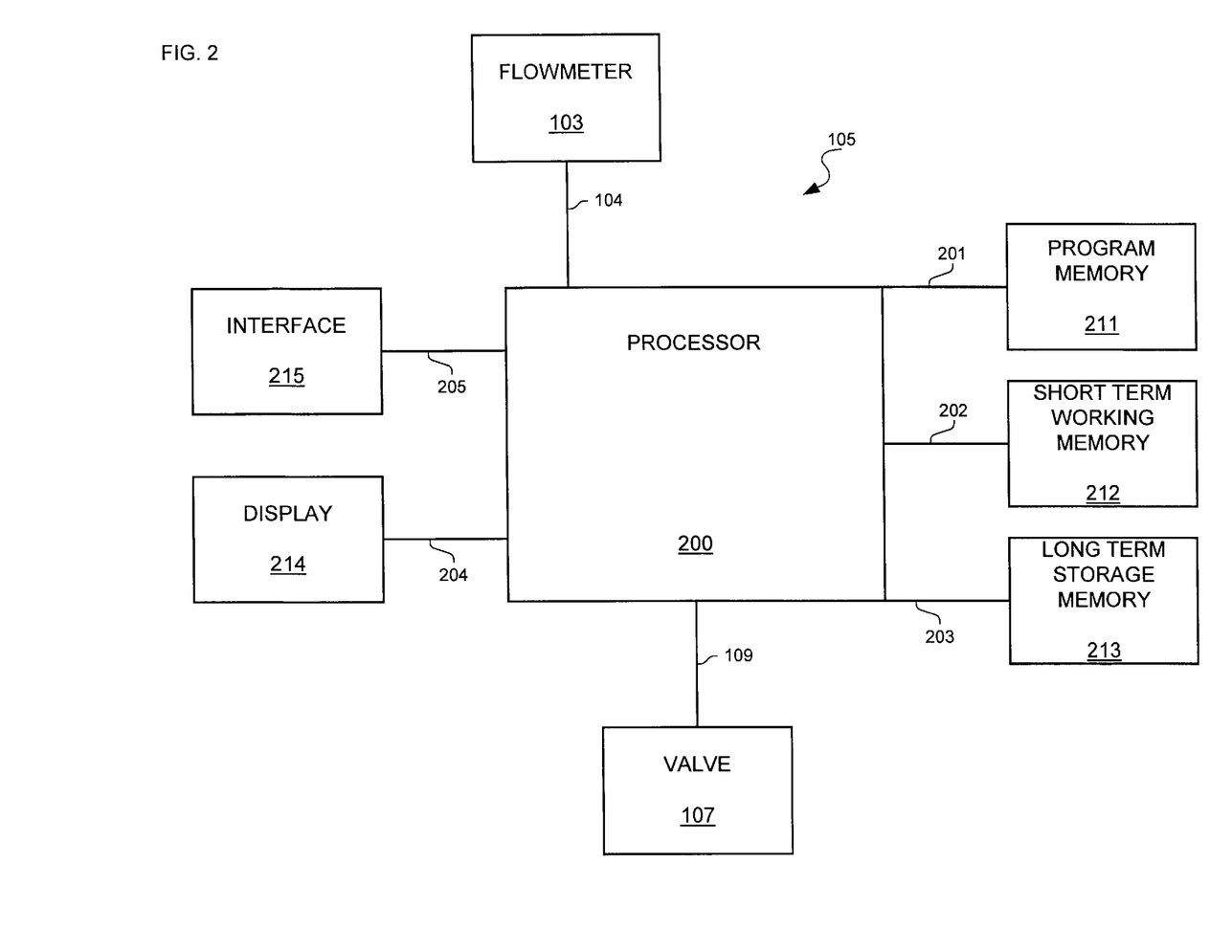
FIG. 2 is a block diagram of a batch controller.

Batch controller 105 is illustrated in block diagram form in FIG. 2. Processor 200 controls the flow of material in batch delivery system 100 by executing instructions read from Program Memory 211 such as a Read Only Memory (ROM) over bus 201. In order to execute these instructions, processor 200 reads data from and writes data to Short Term Working Memory 212 such as a Random Access Memory (RAM) over bus 202. Data is written to and read from Long Term Storage Memory 213 via bus 203.

Processor 200 opens and closes valve 107 by transmitting signals to valve 107 via path 109. Processor 200 can generate display data about the batching process and transmit the data to display 214 over video bus 204. Display 214 is a monitor or equivalent device that can display the display data generated by processor 200. Interface 215 is a keyboard or other such device that allows a user to input data to processor 200 over bus 205. Interface 215 may include a "start" batch button and a "reset" button to reset totals in a batch.

Figure 3:
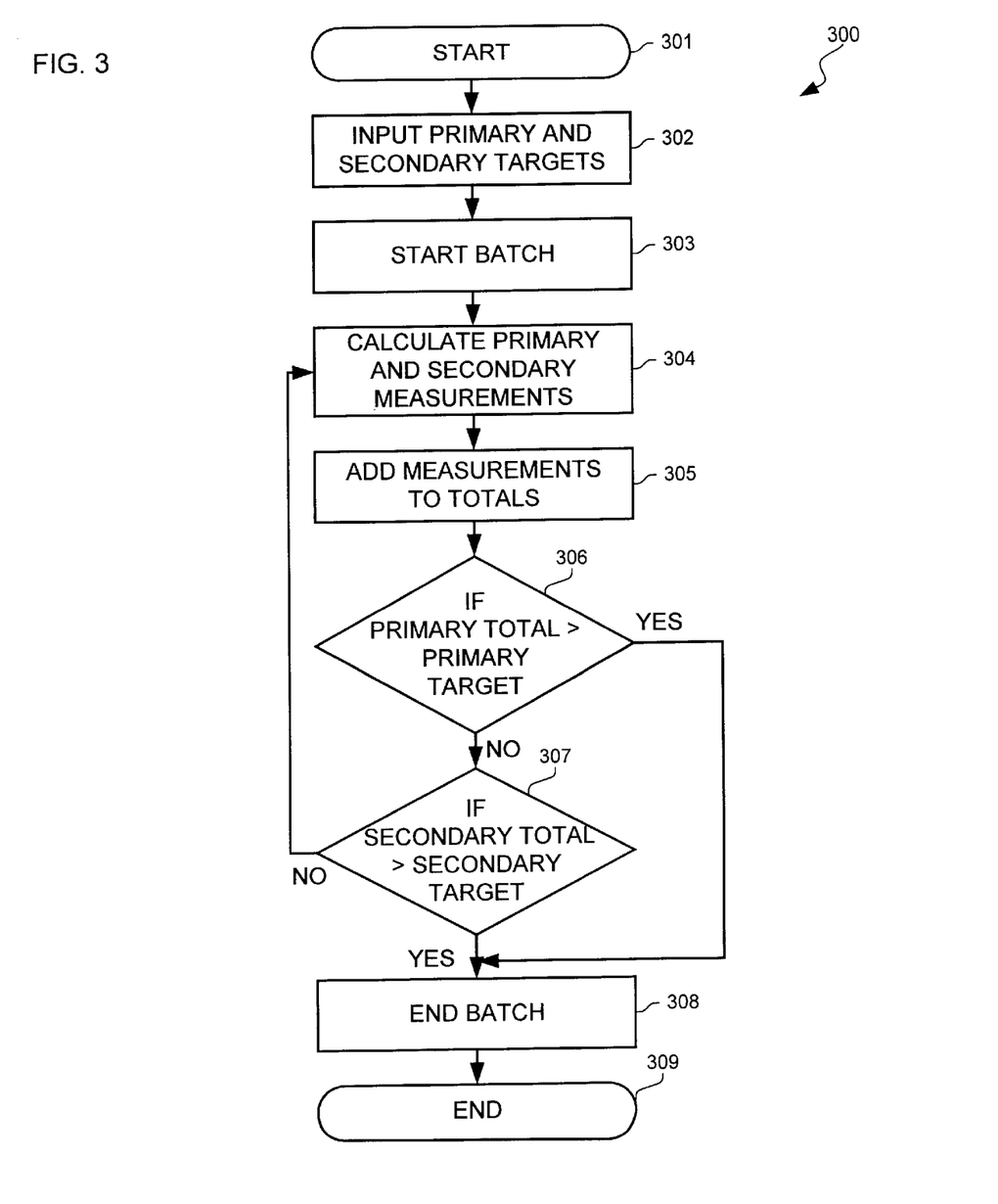
FIG. 3 is a flow chart of the steps in accordance with the present invention.

FIG. 3 is a flow chart that gives an overview of the processes executed by processor 200 in the preferred embodiment of the present invention. Overview process 300 starts at step 301. In step 302, processor 200 receives the primary target and the secondary target inputted by the user. A primary target is the quantity of the most important constraint in the delivery parameters for the delivery of the material to the destination. Typically, the primary target is the lesser quantity of the amount of material a customer has ordered and a primary constraint of the container or transportation. An example of the primary target is a volume of a container such as 5 cubic yards. The secondary target is the quantity of the second most important constraint in the delivery of the material to the destination. An example of the secondary target is the maximum weight allowed per delivery truck such as 5,000 lbs. Step 302 is further described FIG. 4 below.

After the targets are received, processor 200 starts the batch in step 303. Step 303 is further described FIG. 5 below. Once the batch is started, processor 200 calculates a primary measurement and a secondary measurement based upon flow rate information from flowmeter 103 in step 304. The primary measurement is the quantity of material delivered through the flowmeter for a specific period of time calculated from the flow rate information in the same measure as the most important constraint in the delivery parameters. The secondary measurement is the quantity of material delivered through the flowmeter for a specific period of time calculated from the flow rate information in the same measure as the second most important constraint in the delivery parameters. Processor 200 then adds the primary measurement and the secondary measurement to the respective primary total and the secondary total in step 305. The primary total is the total amount of material delivered to the material destination calculated by the summation of the primary measurement. The secondary total is the total amount of material delivered to the material destination calculated by the summation of the secondary measurement. The primary total and secondary total start at zero or some other known point.

In step 306, processor 200 determines if the primary total is greater than or equal to the primary target. If the primary total is greater than or equal to the primary target, processor 200 continues to step 308 to end the batch. If the primary total is less than the primary target, processor 200 continues to step 307. In step 307, processor 200 determines if the secondary total is greater than or equal to the secondary target. If the secondary total is greater than or equal to the secondary target, processor 200 continues to step 308 to end the batch. If the secondary total is less than the secondary target, processor 200 returns to step 304 to calculate the primary measurements and the secondary measurement for more flow rate information from flowmeter 103. Steps 304–307 are further described FIG. 6 below. In step 308, processor 200 ends the batch. Step 308 is further described FIG. 7 below.

Figure 4:
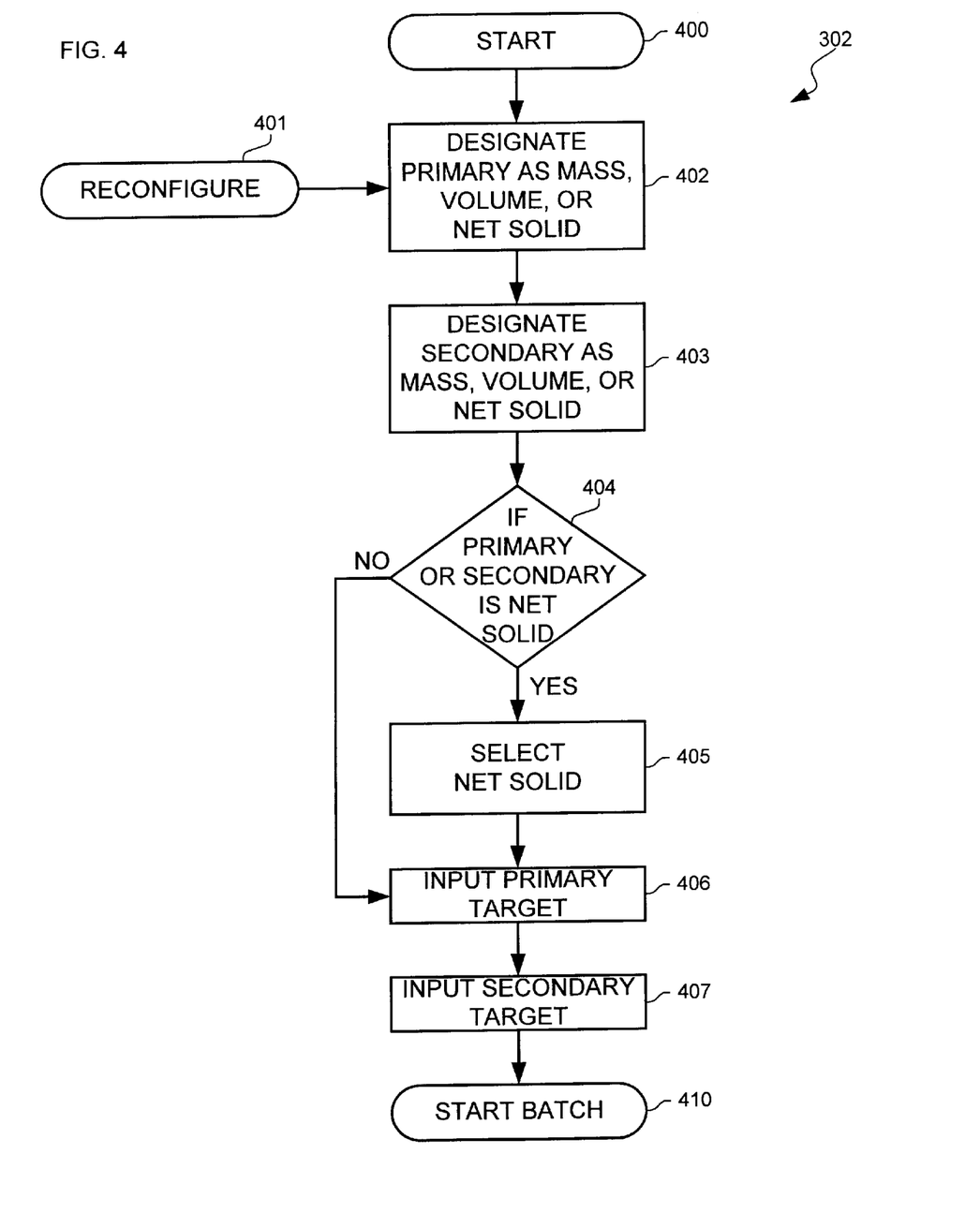
FIG. 4 is a flow chart of a method for configuring the batch in accordance with the present invention.

A flow chart of step 302 is shown in FIG. 4 in one embodiment where the primary target and the secondary target are mass, volume, and/or net solid. Process 302 starts in step 400. Process 302 could also start from step 401 when a batch needs to be reconfigured with new primary targets and secondary targets. In step 402, processor 200 receives a designation of the primary target as mass, volume, or net solid inputted by the user through interface 215. Net solid is the amount of a certain solid within a mixture of the solid and at least one other liquid material such as the amount of sugar in a mixture of sugar and water. For example, the net solid is the net incremental sugar delivered through the flowmeter since the last reading. Once the primary target has been designated, processor 200 receives a designation of the secondary target as mass, volume, or net solid inputted by the user through interface 215 in step 403.

In step 404, processor 200 determines whether the primary target or the secondary target have been designated as net solid. If the primary target or the secondary target have been designated as net solid, processor 200 receives a selection of the net solid inputted by the user through interface 215 from a list of mixtures in step 405 and continues to step 406. An example of a list of mixtures for net solid selection is sugar and water, alcohol and water, and starch and water. If the primary target or the secondary target have not been designated as net solid, processor 200 continues to step 406. In step 406, processor 200 receives the primary target inputted by the user through interface 215. In step 407, processor 200 receives the secondary target inputted by the user through interface 215. Once both targets have been entered, processor 200 continues to step 410 to start the batch delivery.

Figure 5:
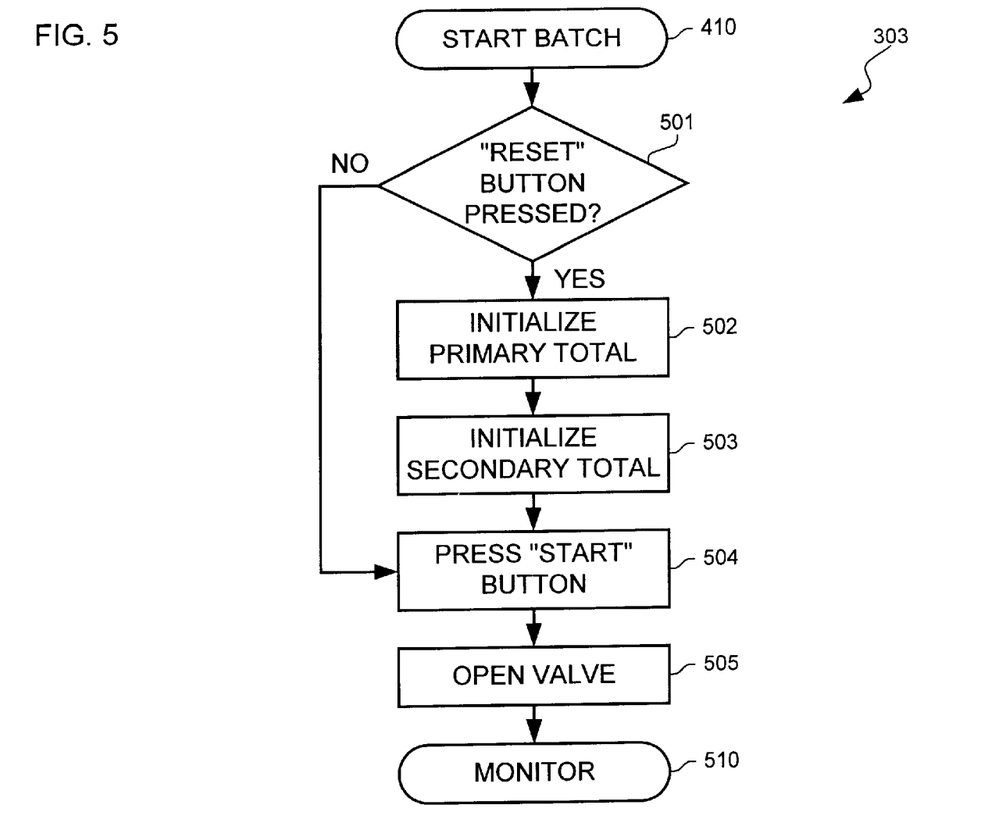
FIG. 5 is a flow chart of a method for starting the batch in accordance with the present invention.

A flow chart of step 303 to start the batch is shown in FIG. 5 in one embodiment where the primary target and the secondary target are mass, volume, and/or net solid. Step 303 begins with step 410 to start the batch delivery. In step 501, processor 200 determines whether the "reset" button on interface 215 was pressed. If the "reset" button was pressed, processor 200 initializes the primary total to zero in step 502. Processor 200 then initializes the secondary total to zero in step 503 and continues to step 504. If the "reset" button was not pressed, processor 200 continues to step 504. In step 504, processor 200 waits until the "start" button is pressed on interface 215. Once the "start" button is pressed, processor 200 sends a start material flow signal to valve 107 to start the batch in step 505. Those skilled in the art will understand that in other embodiments of the invention, the "start" button and the "reset" button in steps 501–504 may be pressed electronically. Processor 200 continues to step 510 to begin monitoring the flow of material during the batch delivery.

A flow chart of steps 304–307 to monitor the flow of material during the batch delivery is shown in FIG. 4 in one embodiment where the primary target and the secondary target are mass, volume, and/or net solid. Processor 200 begins at step 510 on FIG. 6. In step 601, processor 200 receives flow rate information from flowmeter 103 and calculates mass and volume measurements based on the flow rate information. In step 602, processor 200 determines the designation of the primary target. If the primary target designation is mass, processor 200 adds the mass measurement from flowmeter 103 to the primary total in step 603. If the primary target designation is volume, processor 200 adds the volume measurement from flowmeter 103 to the primary total in step 604. If the primary target designation is net solid, processor 200 adds a net solid measurement from the flow rate information to the primary total in step 606.

Figure 6:
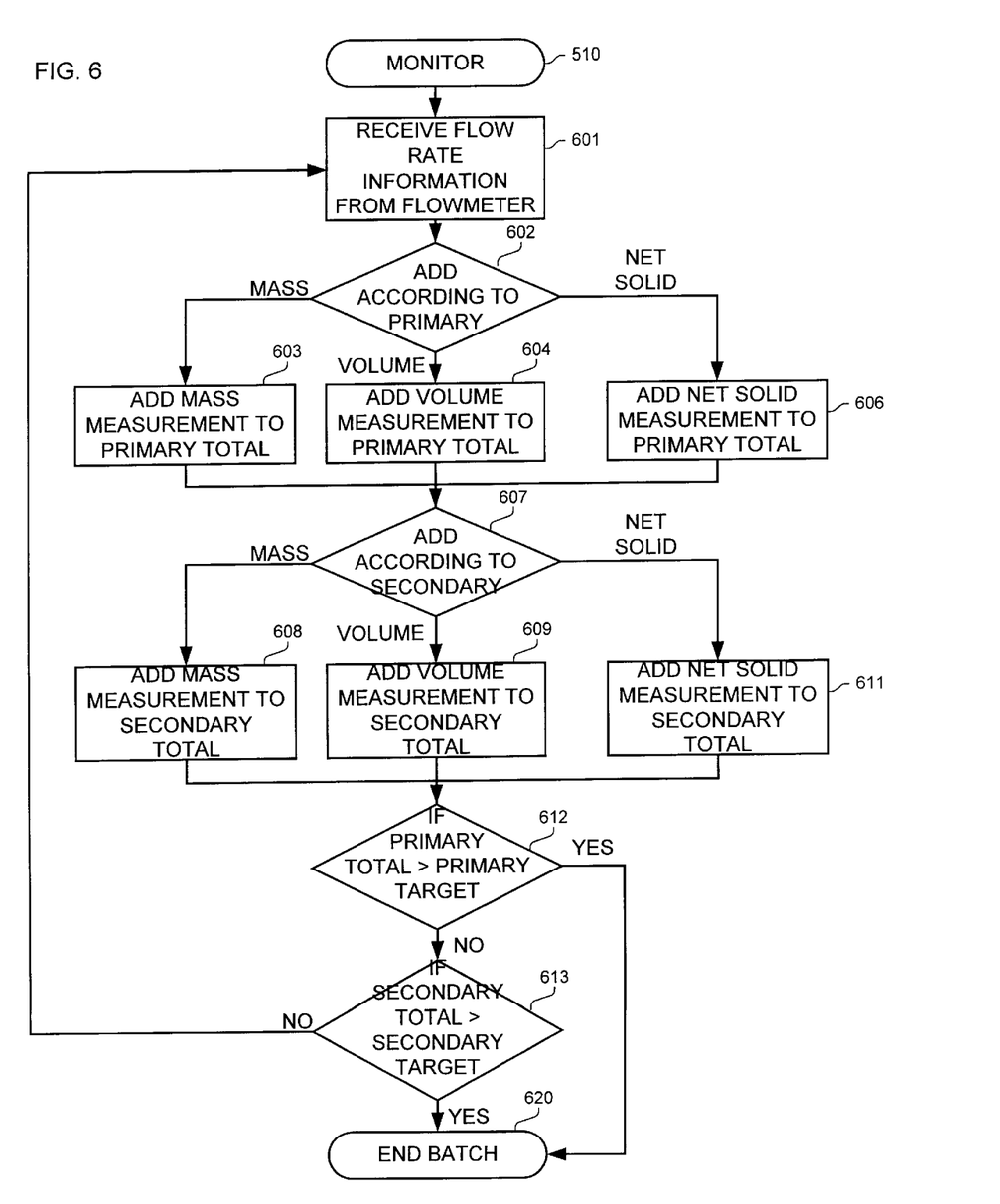
FIG. 6 is a flow chart of a method for monitoring the batch in accordance with the present invention.

The net solid measurement is calculated by flowmeter 103. Flowmeter 103 measures flow rate, density, and temperature. Flowmeter 103 calculates the net solid measurement based on the change in density due to thermal expansion of the mixture and the change in density due to expansion of the liquid material in the mixture. Flowmeter 103 then transmits the net solid measurement to processor 200.

Following the addition of measurements from flowmeter 103 to the primary total, processor 200 determines the designation of the secondary target in step 607. If the secondary target designation is mass, processor 200 adds the mass measurement to the primary total in step 608. If the secondary target designation is volume, processor 200 adds the volume measurement to the primary total in step 609. If the secondary target designation is net solid, processor 200 adds the net solid measurement to the secondary total in step 611.

Following the addition of measurements from flowmeter 103 to the secondary total, processor 200 determines whether the primary total is greater than or equal to the primary target in step 612. If the primary total is greater than or equal to the primary target, processor 200 continues to step 620 to end the batch. If the primary total is less than the primary target, processor 200 continues to step 613. In step 613, processor 200 determines whether the secondary total is greater than or equal to the secondary target. If the secondary total is greater than or equal to the secondary target, processor 200 continues to step 620 to end the batch. If the secondary total is less than the secondary target, processor 200 returns to step 601 to read more flow rate information from flowmeter 103. Processor 200 will repeats steps 601–613 until the primary total or secondary total is at least equal to the respective primary target or the secondary target.

Figure 7:
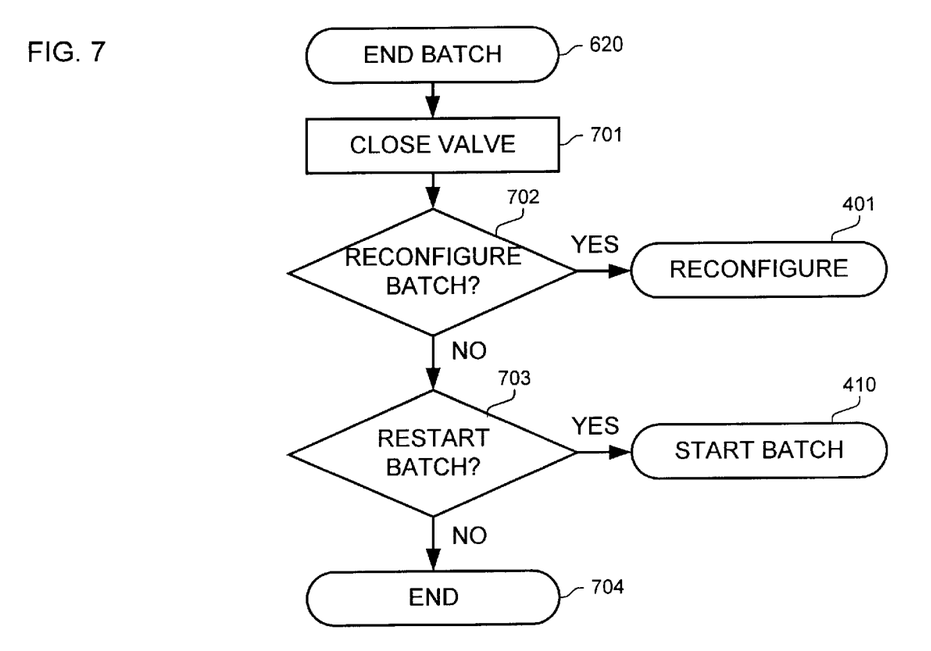
FIG. 7 is a flow chart of a method for ending the batch in accordance with the present invention.

A flow chart of steps 308 to end the flow of material during the batch delivery is shown in FIG. 7 in one embodiment where the primary target and the secondary target are mass, volume, and/or net solid. Processor 200 begins to end the batch at step 620. In step 701, processor 200 sends an end material flow signal to valve 107 to stop the flow of material in the batch. Processor 200 then determines whether the next batch should be reconfigured with new primary targets and secondary targets in step 702. If the batch needs to be reconfigured, processor 200 returns to step 401 to reconfigure the batch. If the batch does not need to be reconfigured, processor 200 continues to step 703. In step 703, processor 200 determines whether the batch needs to be restarted. If the batch needs to be restarted, processor 200 returns to step 410 to start the batch. If the batch does not need to be restarted, processor 200 ends at step 704.

The above described invention relates to maximizing the amount of material delivered to a destination. Although specific embodiments are disclosed for example herein, it is expected that people skilled in the art can and will design alternative methods for maximizing the amount of material to be transferred from a material source to a material destination that is within the scope of the following claims either literally or through the doctrine of equivalents. For example, valve 107 may be a valve or a pump which can be controlled to starustop material flow.

We claim:

1. A method of operating a material delivery system for delivering material from a material source to a material destination, said system comprising the steps of:

(a) starting a delivery of said material;

(b) receiving flow rate information from a flowmeter for said material flowing through said flowmeter;

(c) calculating a primary measurement of material flowing through said flowmeter based upon said flow rate information;

(d) calculating a secondary measurement of material flowing through said flowmeter based upon said flow rate information;

(e) adding said primary measurement to a primary total of material delivered in the delivery of said material;

(f) adding said secondary measurement to a secondary total of material delivered in the delivery of said material;

(g) determining whether said primary total is greater than or equal to a primary target;

(h) terminating delivery of said material responsive to a determination that said primary total is greater than or equal to said primary target;

(i) determining whether said secondary total is greater than or equal to a secondary target responsive to a determination that said primary total is less than said primary target;

(j) terminating delivery of said material responsive to a determination that said secondary total is greater than or equal to said secondary target; and (k) repeating steps (b)–(j) responsive to the determination that said secondary total is less than said secondary target.

2. The method of claim 1 further comprising the steps of:

receiving said primary target for delivering said material from said material source to said material destination prior to said step (a); and receiving said secondary target for delivering said material from said material source to said material destination prior to said step (a).

3. The method of claim 1 wherein in said step of calculating said primary measurement of material flowing through said flowmeter further comprises the step of calculating said primary measurement from a mass flow measurement based on said flow rate information.

4. The method of claim 1 wherein in said step of calculating said primary measurement of material flowing through said flowmeter further comprises the step of calculating said primary measurement from a volume flow measurement from said flow rate information.

5. The method of claim 1 wherein said step of calculating said primary measurement based upon said flow rate information further comprises the steps of:

processing said flow rate information to generate a net solid measurement; and designating said net solid measurement as said primary measurement.

6. The method of claim 1 wherein in said step of calculating said secondary measurement of material flowing through said flowmeter further comprises the step of calculating said secondary measurement from a volume flow measurement from said flow rate information.

7. The method of claim 1 wherein said step of calculating said secondary measurement based upon said flow rate information further comprises the steps of:

processing said flow rate information to generate a net solid measurement; and designating said net solid measurement as said secondary measurement.

8. The method of claim 1 wherein said step of starting said delivery of said material includes a step of opening a valve.

9. The method of claim 1 wherein said step of starting said delivery of said material includes a step of activating a pump.

10. The method of claim 1 wherein said steps of terminating said delivery of said material includes a step of closing a valve.

11. The method of claim 1 wherein said step of terminating said delivery of said material includes a step of controlling a pump.

12. A computer-readable medium having computer-executable instructions for performing a method for operating a material delivery system for delivering material from a material source to a material destination, the method comprising the steps of:

(a) starting a delivery of said material;

(b) receiving flow rate information from a flowmeter for said material flowing through said flowmeter;

(c) calculating a primary measurement of material flowing through said flowmeter based upon said flow rate information;

(d) calculating a secondary measurement of material flowing through said flowmeter based upon said flow rate information;

(e) adding said primary measurement to a primary total of material delivered in the delivery of said material;

(f) adding said secondary measurement to a secondary total of material delivered in the delivery of said material;

(g) determining whether said primary total is greater than or equal to a primary target;

(h) terminating delivery of said material responsive to a determination that said primary total is greater than or equal to said primary target;

(i) determining whether said secondary total is greater than or equal to a secondary target responsive to a determination that said primary total is less than said primary target;

(j) terminating delivery of said material responsive to a determination that said secondary total is greater than or equal to said secondary target; and (k) repeating steps (b)–(j) responsive to the determination that said secondary total is less than said secondary target.

13. The computer-readable medium of claim 12 wherein said computerexecutable instructions further comprise the steps of:

receiving said primary target for delivering said material from said material source to said material destination prior to said step (a); and receiving said secondary target for delivering said material from said material source to said material destination prior to said step (a).

14. The computer-readable medium of claim 12 wherein in said step of calculating said primary measurement, said primary measurement is a mass flow measurement based on said flow rate information.

15. The computer-readable medium of claim 14 wherein in said step of determining whether said primary total is greater than or equal to a primary target, said primary target and said primary totals are mass quantities.

16. The computer-readable medium of claim 12 wherein in said step of calculating said primary measurement, said primary measurement is a volume flow measurement from said flow rate information.

17. The computer-readable medium of claim 16 wherein in said step of determining whether said primary total is greater than or equal to a primary target, said primary target and said primary totals are volume quantities.

18. The computer-readable medium of claim 12 wherein said step of calculating said primary measurement based upon said flow rate information further comprises:

processing said flow rate information to generate a net solid measurement; and designating said net solid measurement as said primary measurement.

19. The computer-readable medium of claim 18 wherein in said step of determining whether said primary total is greater than or equal to a primary target, said primary target and said primary totals are net solid quantities.

20. The computer-readable medium of claim 12 wherein in said step of calculating said secondary measurement, said secondary measurement is a mass flow measurement from said flow rate information.

21. The computer-readable medium of claim 20 wherein in said step of determining whether said secondary total is greater than or equal to a secondary target, said secondary target and said secondary totals are mass quantities.

22. The computer-readable medium of claim 12 wherein in said step of calculating said secondary measurement, said secondary measurement is a volume flow measurement from said flow rate information.

23. The computer-readable medium of claim 22 wherein in said step of determining whether said secondary total is greater than or equal to a secondary target, said secondary target and said secondary totals are volume quantities.

24. The computer-readable medium of claim 12 wherein said step of calculating said secondary measurement based upon said flow rate information further comprises:

processing said flow rate information to generate a net solid measurement; and designating said net solid measurement as said secondary measurement.

25. The computer-readable medium of claim 24 wherein in said step of determining whether said secondary total is greater than or equal to a secondary target, said secondary target and said secondary totals are net solid quantities.

26. The computer-readable medium of claim 12 wherein said step of starting said delivery of said material includes a step of opening a valve.

27. The computer-readable medium of claim 12 wherein said step of starting said delivery of said material includes a step of activating a pump.

28. The computer-readable medium of claim 12 wherein said steps of terminating said delivery of said material includes a step of closing a valve.

29. The computer-readable medium of claim 12 wherein said step of terminating said delivery of said material includes a step of controlling a pump.

* * * * *

UNITED STATES PATENT AND TRADEMARK OFFICE
CERTIFICATE OF CORRECTION

PATENT NO.   : 6,173,214 B1
DATED        : January 9, 2001
INVENTOR(S)  : Dinesh Neelay and Glen Campbell It is certified that error appears in the above-identified patent and that said Letters Patent is hereby corrected as shown below:

Column 3,
Line 44, replace "volume of the truck (5 cubit yards) and the secondard target" with -- volume of the truck (5 cubic yards) and the secondard target --.
Line 47, replace "assumes a maximum density a 1250 lbs./cubic yards based" with -- assumes a maxium density of 1250 lbs./cubic yards based --.

Column 4,
Line 64, replace "ondary measurement basic upon said flow rate information" with -- ondary measurement based upon said flow rate information --.

Column 5,
Line 34, replace "applied to flowmeter 103 over path 102. Valve 10' receives" with -- applied to flowmeter 103 over path 102. Valve 107 receives --.
Line 36, replace "may alternatively be pump. The material flows from valve" with -- may alternatively be a pump. The material flows form valve --.

Column 8,
Line 51, replace "controlled to starustop material flow." with -- controlled to start/stop material flow. --.

Column 10,
Line 36, replace "said computerexecutable instructions further comprise the" with -- said computer-executable instructions further comprise the --.

Signed and Sealed this

Eleventh Day of December, 2001

*Attest:*

NICHOLAS P. GODICI
*Attesting Officer*   *Acting Director of the United States Patent and Trademark Office*